(12) United States Patent  (10) Patent No.: US 7,392,348 B2
Dumont  (45) Date of Patent: Jun. 24, 2008

(54) METHOD FOR VALIDATING REMOTELY CACHED DYNAMIC CONTENT WEB PAGES

(75) Inventor: Charles E. Dumont, Pepperell, MA (US)

(73) Assignee: International Business Machines Corporation, Armonk, NY (US)

( * ) Notice: Subject to any disclaimer, the term of this patent is extended or adjusted under 35 U.S.C. 154(b) by 623 days.

(21) Appl. No.: 10/635,075

(22) Filed: Aug. 6, 2003

(65) Prior Publication Data

US 2005/0033926 A1 Feb. 10, 2005

(51) Int. Cl.
*G06F 12/00* (2006.01)

(52) U.S. Cl. .................. 711/137; 711/118; 709/216; 709/219

(58) Field of Classification Search .................. 711/137
See application file for complete search history.

(56) References Cited

U.S. PATENT DOCUMENTS

| | | | |
|---|---|---|---|
| 5,550,995 | A | 8/1996 | Barrera et al. |
| 5,787,479 | A | 7/1998 | Jessani et al. |
| 6,157,986 | A | 12/2000 | Witt |
| 6,175,906 | B1 | 1/2001 | Christie |
| 6,351,767 | B1 | 2/2002 | Batchelder et al. |
| 6,408,360 | B1 | 6/2002 | Chamberlain et al. |
| 6,757,705 | B1 * | 6/2004 | Pardikar et al. ............. 709/203 |
| 2002/0026563 | A1 * | 2/2002 | Chamberlain et al. ........ 711/138 |
| 2002/0156832 | A1 * | 10/2002 | Duri et al. .................... 709/203 |
| 2002/0194382 | A1 * | 12/2002 | Kausik et al. ................ 709/246 |
| 2003/0105838 | A1 * | 6/2003 | Presley ........................ 709/220 |
| 2003/0182357 | A1 * | 9/2003 | Chess et al. ................. 709/203 |
| 2004/0111463 | A1 * | 6/2004 | Amon et al. ................. 709/203 |

FOREIGN PATENT DOCUMENTS

WO    WO 02/099660 A1    12/2002

OTHER PUBLICATIONS

IBM Technical Disclosure Bulletin, "Sub-Block Cache with Demand Sub-Block Reloading in Conjunction with A Risc System", vol. 35, No. 1A, Jun. 1992, pp. 84-85.
INSPEC, Yonghwan, L. et al., 1997-1998.

(Continued)

*Primary Examiner*—Donald Sparks
*Assistant Examiner*—Hashem Farrokh
(74) *Attorney, Agent, or Firm*—Eric Damon; Hoffman, Warnick & D'Alessandro LLC

(57) ABSTRACT

Under the present invention, when a request for a web page is received from a client on a server, the web page is built and analyzed for cacheablity. If the web page is cacheable, an entity tag is generated. The entity tag generally identifies the various sources of dynamic content in the web page, and includes cacheability flags and time values associated with the dependencies. The entity tag is sent to the client with the web page where it is stored in local cache memory. If a subsequent request for the same web page is issued from the client, the request is accompanied with the entity tag (e.g., in a header). The entity tag is decoded and analyzed by the server to determine whether the cached web page is still valid.

17 Claims, 4 Drawing Sheets

OTHER PUBLICATIONS

Barrera, "Sub-Block Cache with Demand Sub-Block Reloading in Conjunction with a RISC System", Technical Disclosure Bulletin, No. 1A, Jun. 1992, pp. 84-85.

Jeffrey C. Mogul, "Clarifying the Fundamentals of HTTP", May 2002, pp. 25-36.

Kelly et al., "Aliasing on the World Wide Web: Prevalence and Performance Implications", May 2002, pp. 281-292.

IEICE Transactions on Fundamentals of Electronics, Communications and Computer Sciences, Lee, Y. et al., "Unified Tag Memory Architecture with Snoop Support", vol. E81-A, Issue 6, Jun. 1998, pp. 1172-1175.

International Semiconductor Conference, 20th Edition, Oct. 7-11, 1997, Sinaia, Romania, CAS '97 Proceedings, vol. 1, Lee, Y. et al. "Shared Tag for MMU and Cache Memory", pp. 77-80.

Electronics Letters, vol. 33, Issue 21, Oct. 9, 1997, Lee, Y. et al., "Indirectly-Compared Cache Tag Memory Using a Shared Tag in a TLB", pp. 1764-1766.

* cited by examiner

METHOD FOR VALIDATING REMOTELY CACHED DYNAMIC CONTENT WEB PAGES

BACKGROUND OF THE INVENTION

1. Field of the Invention

The present invention generally relates to a method, system and program product for validating cached dynamic content web pages in caches located remotely from the server. Specifically, the present invention allows a cached dynamic content web page to be validated without the server having to rebuild or evaluate the web page itself.

2. Related Art

As the use of computers becomes more pervasive, computer users are increasingly relying on computer networks to perform everyday functions. For example, today a computer user can purchase goods/services or obtain information over the Internet. Typically, a computer user will issue a request for a certain web page from a "client" that is received by a "server." The server will analyze the request, build the web page, and serve the web page to the client. If the same web page is requested at a later time, the serve can reconstruct and retransmit the web page to the client. Unfortunately, retransmission of a dynamic content web page wastes valuable resources when the web page has not changed. Accordingly, a popular technology that helps prevent unnecessary retransmission of web pages is caching. One example of how caching can be utilized to help prevent unnecessary web page retransmission is described in U.S. Pat. No. 6,351,767 ('767), which is commonly assigned with the present application to International Business Machines, Corp. of Armonk, N.Y. and is hereby incorporated by reference.

Under '767, when a web page is originally built and sent to a client, it is also analyzed for cacheability. If it is determined that the web page is cacheable, it is stored in cache memory both on the server and on the client. When the same web page is later requested, the server will first attempt to retrieve the page from its own cache. If the page is not in the server's cache, and the client has communicated to the server that it has a cached version of the page which requires validation, the server will attempt to validate the cached we page through evaluation. Specifically, the server will rebuild the web page and compare time values (i.e., "last modified dates") of the cached web page to the rebuilt web page. If the time values are the same, the cached web page is still valid and the client can retrieve its cached copy of the web page for display to the user. Conversely, if the time values have changed, the cached web page is stale, and the rebuilt web page is sent to the client. Although such a system avoids unnecessary retransmission of the web page, it nevertheless can consume a large amount of resources of the server in rebuilding the web page to perform the validation. Specifically, as known, a single web page can include content from numerous sources. To rebuild the web page, the server would have to evaluate the page to determine the sources of data and to interface with each source to obtain the necessary content and determine dependencies on additional sources of data. Accordingly, the processing demands on the server are not eased by the caching.

In view of the foregoing, a need exists for a method, system and program product for validating cached dynamic content web pages in remote caches. Specifically, a need exists for a system that can validate a cached dynamic content web page without having to evaluate (rebuild) the web page.

SUMMARY OF THE INVENTION

In general, the present invention provides a method, system and program product for validating cached dynamic content web pages in remote caches. Specifically, under the present invention, when a request for a web page is received from a client on a server, the web page is built and analyzed for cacheablity. If the web page is cacheable, an entity tag is generated. The entity tag is generally based on sources of the dynamic content in the web page, and any dependencies on those sources. To this extent, the entity tag not only identifies the various sources of dynamic content in the web page, but it also includes cacheability flags and time values associated with the dependencies. The entity tag is sent to the client with the web page where it is stored in local cache memory. If a subsequent request for the same web page is later issued from the client, the request is accompanied with the entity tag (e.g., in a header). The entity tag is decoded and analyzed by the server to determine whether the web page is still valid. Specifically, the time values in the entity tag are compared to corresponding time values for the sources of the dynamic content. If the time values match, the cached web page is still valid. In this case, a simple status code (e.g., HTTP 304—Not Modified) can be sent to the client. Conversely, if the time values do not match, the web page is no longer valid. At that point, the web page will be rebuilt and sent to the client.

A first aspect of the present invention provides a method for validating remotely cached dynamic content web pages, comprising: determining a cacheability of a response to a client request, sources of dynamic content in the response and a set of dependencies on the sources; generating an entity tag based on the cacheability, the sources and the set of dependencies; returning and caching the response and the entity tag on the client; receiving a subsequent request from the client with the entity tag; and analyzing the entity tag to determine if the cached response is valid.

A second aspect of the present invention provides a method for validating remotely cached dynamic content web pages, comprising: determining a cacheability of a response to a client request for a dynamic content web page, sources of dynamic content in the response and a set of dependencies on the sources; generating an entity tag, wherein the entity tag identifies the sources and includes cacheability flags and time values associated with the set of dependencies; returning and caching the response and the entity tag on the client; receiving a subsequent request for the dynamic content web page from the client with the entity tag; and comparing the time values in the entity tag with corresponding time values for the sources to determine if the cached response is valid.

A third aspect of the present invention provides a system for validating remotely cached dynamic content web pages, comprising: a tag generator for generating an entity tag for a response to a client request for a dynamic content web page, wherein the entity tag identifies sources of dynamic content in the response and includes cacheability flags corresponding to a cacheability of the response and time values associated with a set of dependencies on the sources, and wherein the response and the entity tag are cached on the client; and a tag analyzer for analyzing the entity tag when received from the client with a subsequent request for the dynamic content web page to determine if the cached response is valid.

A fourth aspect of the present invention provides a program product stored on a tangible recordable medium for validating remotely cached dynamic content web pages, which when executed, comprises: program code for generating an entity tag for a response to a client request for a dynamic content web page, wherein the entity tag identifies sources of dynamic content in the response and includes cacheability flags corresponding to a cacheability of the response and time values associated with a set of dependencies on the sources, and wherein the response and the entity tag are cached on the client; and program code for analyzing the entity tag when received from the client with a subsequent request for the dynamic content web page to determine if the cached response is valid.

BRIEF DESCRIPTION OF THE DRAWINGS

These and other features of this invention will be more readily understood from the following detailed description of the various aspects of the invention taken in conjunction with the accompanying drawings in which.

Figure 1:
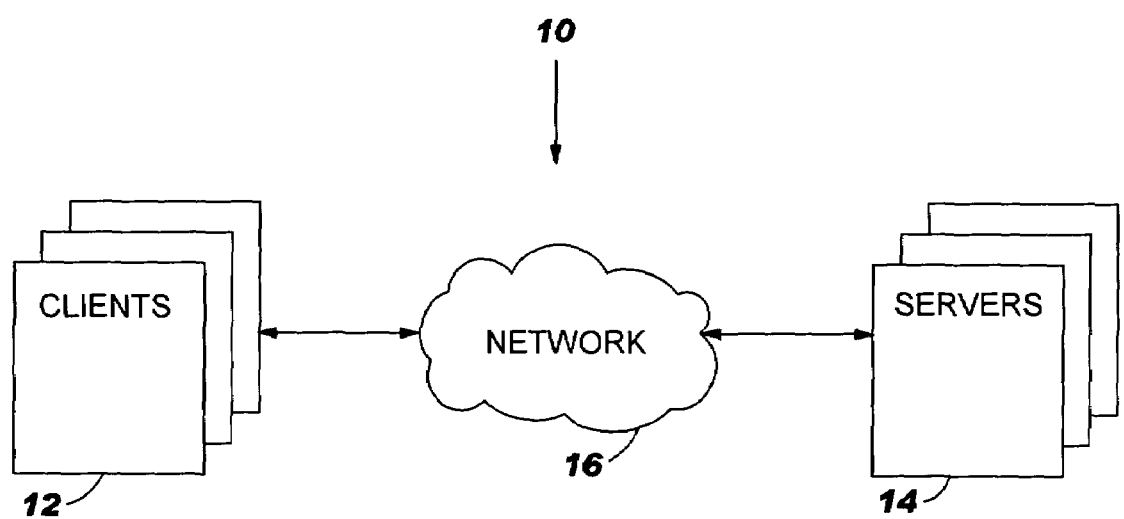
FIG. 1 depicts a set of clients communicating with a set of servers over a network.

The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

As indicated above, the present invention provides a method, system and program product for validating remotely cached dynamic content web pages. Specifically, under the present invention, when a request for a web page is received from a client on a server, the web page is built and analyzed for cacheablity. If the web page is cacheable, an entity tag is generated. The entity tag is generally based on sources of the dynamic content in the web page, and any dependencies on those sources. To this extent, the entity tag not only identifies the various sources of dynamic content in the web page, but it also includes cacheability flags and time values associated with the dependencies. The entity tag is sent to the client with the web page where it is stored in local cache memory. If a subsequent request for the same web page is later issued from the client, the request is accompanied with the entity tag (e.g., in a header). The entity tag is decoded and analyzed by the server to determine whether the web page is still valid. Specifically, the time values in the entity tag are compared to corresponding time values for the sources of the dynamic content. If the time values match, the cached web page is still valid. In this case, a simple status code (e.g., HTTP 304—Not Modified) can be sent to the client. Conversely, if the time values do not match, the web page is no longer valid. At that point, the web page will be rebuilt and sent to the client.

It should be understood in advance that the present invention allows the validation of cached dynamic content web pages to occur, in part, using the HTTP 1.1 specification. Specifically, under the HTTP 1.1 specification, when a web browser requests a web page from a server, the server can send the response with certain headers that contain information that can be used for subsequent cache validation. These headers include a Last-Modified header and an E-Tag header. The Last-Modified header specifies the time and date that the web page was last modified, while the E-Tag header specifies the entity (e.g., version, revision, etc.) of the requested web page. The content of an E-Tag header is not defined by the HTTP 1.1 specification, but it can contain any data that is meaningful to the server for cache validation. If the web browser caches the web page locally, it saves the information from the headers along with the web page. If the browser later requests the same web page, it can do so by sending a conditional GET request, which includes either an If-Modified-Since with the last-modified date or If-None-Match header with the E-Tag, to the server.

Referring now to FIG. 1, a typical implementation 10 of network-based communication with which the present invention is implemented is shown. As depicted, one or more clients 12 communicate with one or more servers 14 over network 16. Under the present invention, clients 12 and servers 14 can represent any type of computerized systems. For example, clients 12 and/or servers 14 could be a personal computer, workstation, laptop, hand held device, etc. Moreover, network 16 can be any type of public network such as the Internet, or ant type of private network such as a local area network (LAN), wide area network (WAN), a virtual private network (VPN), etc. To this extent, servers 14 are typically web servers such as DOMINO web servers, which are commercially available from International Business Machines, Corp. of Armonk, N.Y. In another embodiment, servers 14 can be portal servers that deliver portal pages to clients 12. In any event, a user will operate a web browser on a client 12 to request a web page from a server 14. The server 14 will generate the web page by obtaining content from the corresponding sources. Once generated, the web page is sent back to the requesting client 12 where it can be cached. As will be further described below, under the present invention, the web page is sent to the client 12 with an entity tag that not only identifies the sources of the dynamic content, but also includes time values associated with any dependencies on the sources. This entity tag is utilized in conjunction with the HTTP 1.1 specification to optimize the validation of the cached dynamic content web page.

Figure 2:
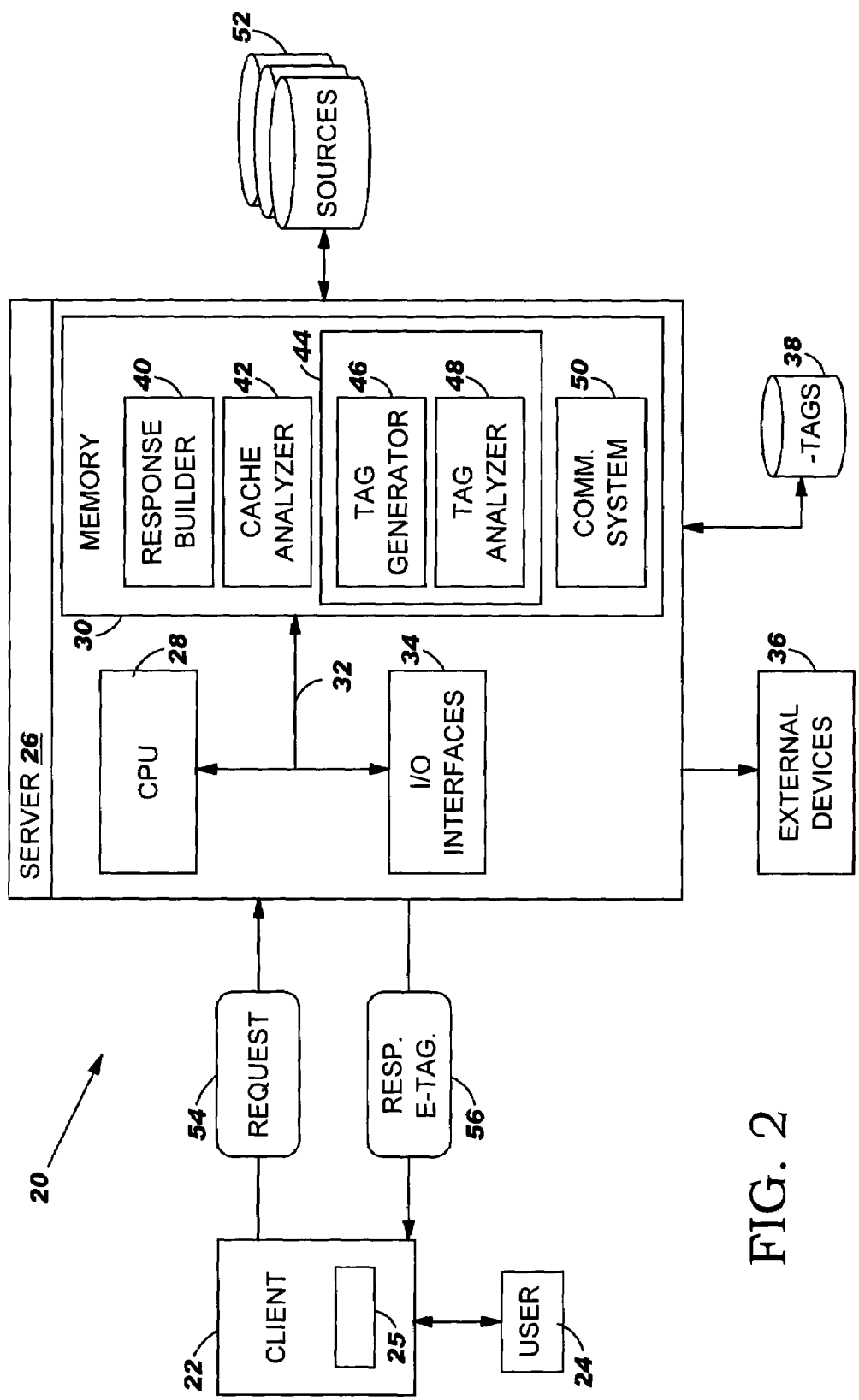
FIG. 2 depicts a system for validating cached dynamic content web pages, according to the present invention.

Referring now to FIG. 2, a more detailed diagram of a system 20 for validating cached dynamic content web pages under the present invention is shown. As shown, client 22 communicates with server 26, which obtains dynamic content for the web pages from sources 52. In general, server 26 comprises central processing unit (CPU) 28, memory 30, bus 32, input/output (I/O) interfaces 34, external devices/resources 36 and storage unit 38. CPU 28 may comprise a single processing unit, or be distributed across one or more processing units in one or more locations, e.g., on a client and computer system. Memory 30 may comprise any known type of data storage and/or transmission media, including magnetic media, optical media, random access memory (RAM), read-only memory (ROM), a data cache, a data object, etc. Moreover, similar to CPU 28, memory 30 may reside at a single physical location, comprising one or more types of data storage, or be distributed across a plurality of physical systems in various forms.

I/O interfaces 34 may comprise any system for exchanging information to/from an external source. External devices/resources 36 may comprise any known type of external device, including speakers, a CRT, LCD screen, hand-held device, keyboard, mouse, voice recognition system, speech output system, printer, monitor/display, facsimile, pager, etc. Bus 32 provides a communication link between each of the components in server 26 and likewise may comprise any known type of transmission link, including electrical, optical, wireless, etc.

Storage unit 38 can be any system (e.g., a database) capable of providing storage for information such as entity tags under the present invention. As such, storage unit 38 could include one or more storage devices, such as a magnetic disk drive or an optical disk drive. In another embodiment, storage unit 38 includes data distributed across, for example, a local area network (LAN), wide area network (WAN) or a storage area network (SAN) (not shown).

As indicated above, the teachings of the present invention are implemented in a network environment such as over the Internet, a wide area network (WAN), a local area network (LAN), a virtual private network (VPN), etc. To this extent, communication between client 22 and server 26 could occur via a direct hardwired connection (e.g., serial port) or via an addressable connection that may utilize any combination of wireline and/or wireless transmission methods. Server 26 and client 22 may utilize conventional network connectivity, such as Token Ring, Ethernet, WiFi or other conventional communications standards. Moreover, connectivity could be provided by conventional TCP/IP sockets-based protocol. In this instance, client 22 would utilize an Internet service provider to establish connectivity to server 26.

As shown, memory 30 includes response builder 40, cache analyzer 42, tag system 44 and communication system 50. It should be understood that response builder 40, cache analyzer 42 and communication system 50 will likely incorporate one or more features disclosed in U.S. Pat No. 6,351,767, which was incorporated by reference above. In general, user 24 will operate web browser 25 on client 22 to generate request 54 for a dynamic content web page. Request 54 will be communicated to server 26 and received by communication system 50, which can include components not shown such as a HTTP server. Upon receipt, response builder 40 will build the requested web page. Building the response involves interfacing with sources 52 to obtain the necessary dynamic content. To this extent, it should be understood that sources 52 are intended to represent any type of system from which dynamic content can be retrieved. For example, sources 52 could be DOMiNO databases, files etc. As such, similar to storage unit 38 sources 52 could include one or more storage devices, such as a magnetic disk drive or an optical disk drive. In another embodiment, sources 52 could include data distributed across, for example, a local area network (LAN), wide area network (WAN) or a storage area network (SAN) (not shown).

Figure 3:
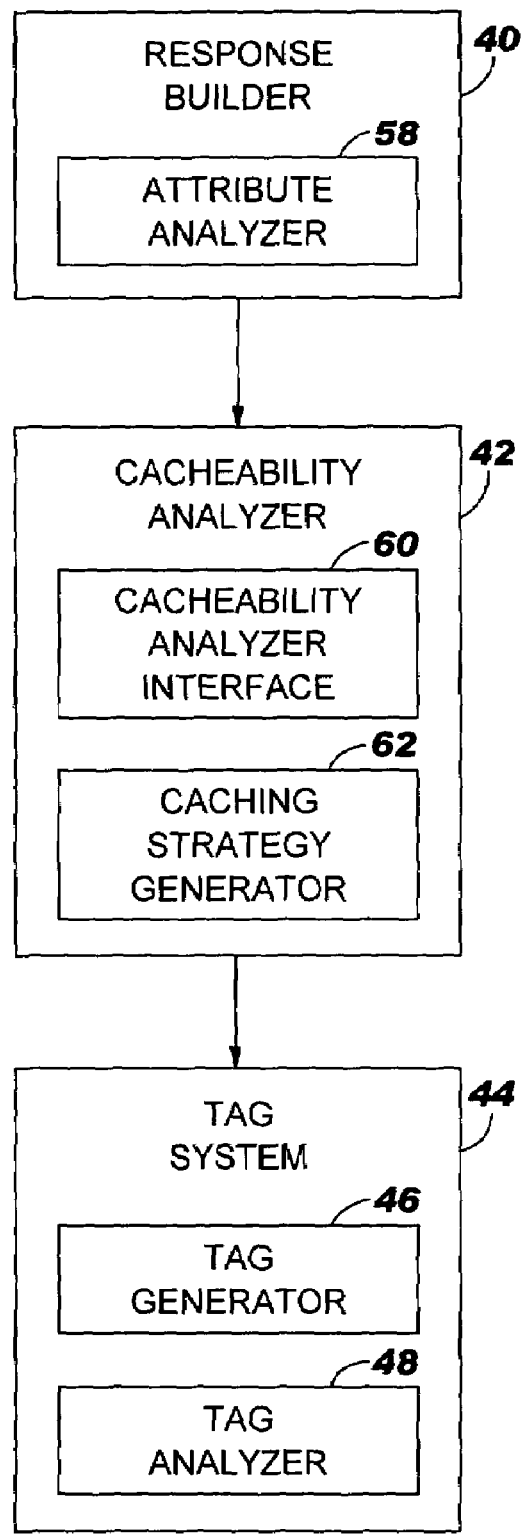
FIG. 3 depicts a more detailed diagram of the response builder, cacheability analyzer and tag system of FIG. 2.

Referring to FIGS. 2 and 3 collectively, a more detailed description of response builder 40, cache analyzer 42 and tag system 44 will be given. When request 54 is received by server 26, the URL therein is parsed by a parser (not shown) into different parts. The parsed URL is then used by response builder 40 to obtain the necessary dynamic content from sources 52 and build the response (i.e., the requested web page). Once the parts of the response are determined, attribute analyzer 58 will analyze the parts to identify the attributes thereof. As a result of this analysis, additional sources of dynamic content may be identified. In general, the attributes identify a set (e.g., one or more) of dependencies of the content on sources 52. Specifically, the content within the response could change depending on several factors. Such factors could include, for example, a database design, data within the database, data within a particular document, the particular user's identity, etc. Accordingly, the following illustrative attributes could be identified by attribute analyzer 58:

UserVariant—The response is dependent on the user's identity.

DesignUserVariant—The response is from a database that has protected elements.

DbData—The response uses data in the database other than the referenced document.

UsedDocId—The response uses the document ID.

UsedNewDoc—The response uses a newly-created in-memory note.

It should be understood that this list is a non-exhaustive list given for illustrative purposes. Additional examples are shown in the above-referenced '767 patent.

In any event, after attribute analyzer 58 has developed a composite of attributes for the parts of the response, the composite will be passed to cacheability analyzer interface 60 of cacheability analyzer 42. As described in '767, caching strategy generator 62 will examine the composite of attributes to determine whether the response is cacheable, and to generate a set (e.g., one or more) of cacheability flags based thereon. The cacheability flags reflect a caching strategy for the response. Illustrative flags are as follows:

DontCache—The response is not cached.

Document—Invalidate the cached response when the document changes.

DbDesign—Invalidate the cached response when the database design changes.

DbData—Invalidate the cached response when any of the data in the database changes.

Using an algorithm such as disclosed in '767, the cacheability flags are set. If the determination is that the response is cacheable, the set cacheability flags are passed to tag system 44. Under the present invention, tag generator 46 will then generate an entity tag for the response that is generally based on the sources of the content, as well as any dependencies of the response on those sources. Specifically, the entity tag will identify the sources of the dynamic content in the response, and will include a tag version number, the cacheability flags, time values, and optionally, a document identifier and a user name (if the dependencies so require). Accordingly, the entity tag could resemble the following:

XX-YYYY-DesignTimeDate-DateTimeDate-UNID-UserName where:

XX represents major and minor version numbers of the tag format (e.g. 10)

YYYY represents ASCII hex string representation of the 16 bit cacheability flags field.

DesignTimeDate represents the last modified time value of the database design as a 16 digit ASCII hex string.

DateTimeDate represents a 16 digit ASCII hex string of either the last modified time value of data in the database, or of a specific document in the database on which the response depends.

UNID represents the document identifier in the event DateTimDate refers to a specific document in the database.

UserName refers to the name of the specific user issuing the request in the event the response is user variant.

It should be understood that in most cases, content within the response will generally be dependent on either data within the database, or a specific document within the database. Although a response can depend on both, since the document resides within the database, the database last modified date will always be the same or later than the last-modified date of the most recently modified document therein. Accordingly, it is not typically necessary to record both, and DateTimeDate can represent one or the other. In the case of the former, if any data within the database changes, a cached response is no longer valid. In the case of the latter, if data within the document identified by the UNID changes, the cached response is no longer valid. In any event, once the entity tag is generated it is Base64 encoded, wrapped in quotation marks and preceded by "W/" to indicate that the entity tag is a weak cache validator (as described in the HTTP 1.1 specification). Identifying the entity tag as a weak cache validator essentially ensures that it will only be used with HTTP GET and HEAD requests, and that at most one entity tag will be associated with any given request.

The entity tag will accompany the response in an "E-Tag" header as communicated to client 22 via communication system 50. Upon receipt, the response and entity tag 56 are cached in browser 25. If user 24 later requests the same web page, a conditional get request is issued. Specifically, the entity tag is sent to server 26 in an "If-Non-Match" header. Upon receipt, communication system 50 will forward the entity tag to tag analyzer 48, which will decode the entity tag and determine whether the cached response is valid. Specifically, tag analyzer 48 will compare the time values in the entity tag to corresponding time values for the sources identified by the entity tag. If the time values match, the cached response is still valid. Thereafter, a status code (e.g., HTTP 304—Not Modified) will be sent to client 22 so that the cached response can be displayed for user 24 Conversely, if one or more of the time values do not match, or if the entity tag indicates that the cached response is user variant and the user name encoded within the entity tag does not match the logged-in user name, the response is no longer valid (i.e., is stale). Accordingly, response builder 40 will build a new response and a new composite set of attributes that cacheability analyzer 42 will use to determine whether the new response is cacheable and to generate a new set of cacheability flags. The new set of cacheability flags is then used by tag system 44 to generate a new entity tag that is sent to client 22 with the new response in an "E-Tag" header. Similar to the previous response, the new response and entity tag are cached in browser 25 for possible later use. As can be seen, the present invention allows remotely cached dynamic content web pages to be validated simply by analyzing the entity tag. That is, no evaluation or rebuilding of the web page is required.

Figure 4:
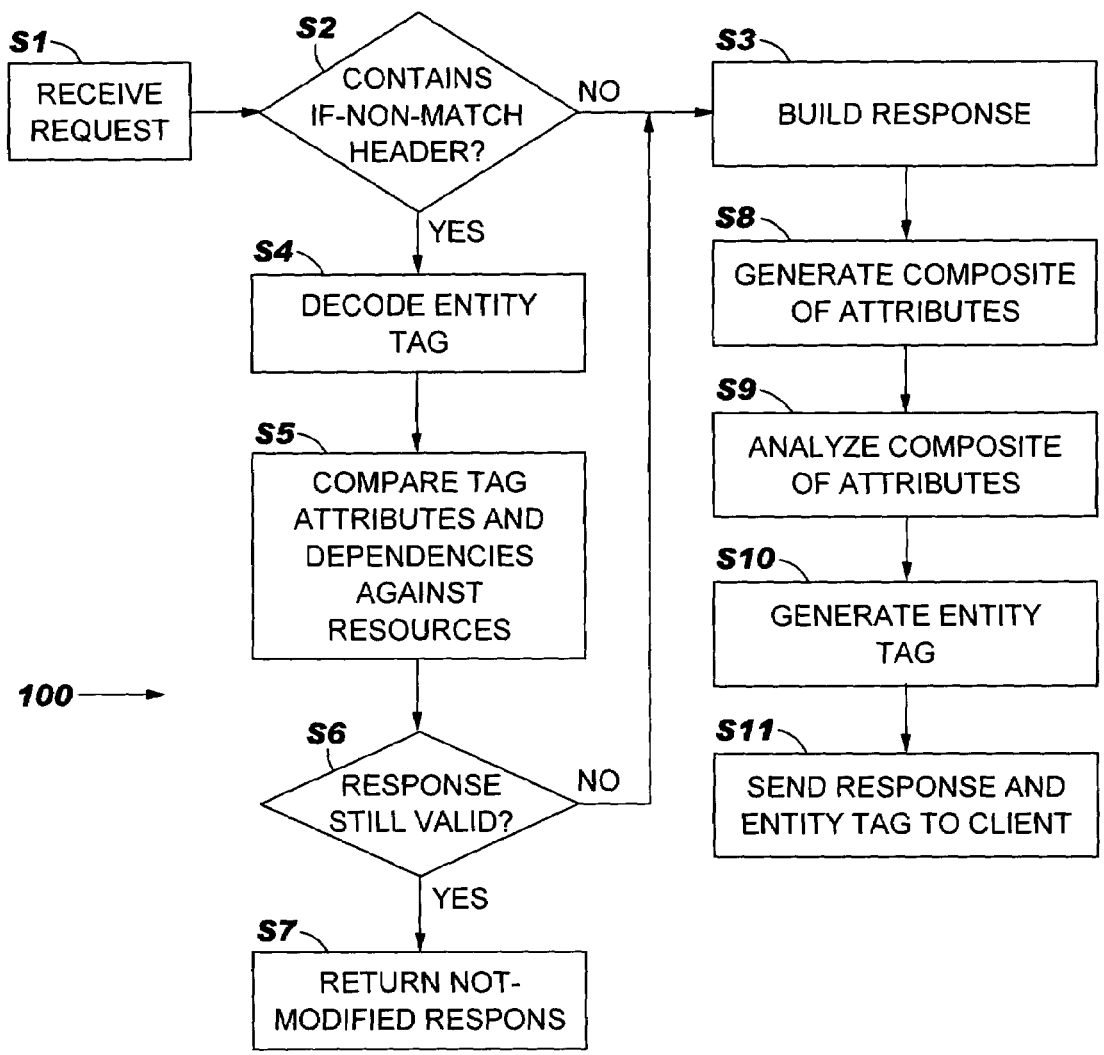
FIG. 4 depicts a method flow diagram, according to the present invention.

Referring now to FIG. 4, a method flow diagram 100 of the present invention is shown. As depicted, first step S1 is to receive a request. In step S2, it is determined if the response contains an If-None-Match header. If not, a response is built in step S3. However, if the request did contain an If-None-Match header, the entity tag therein would be decoded in step S4. Thereafter, the tag attributes and dependencies would be compared against the corresponding resources in step S5. That is, the time values in the entity tag would be compared to corresponding time values of the relevant dynamic content sources. Based on the comparison, it would be determined whether the response is still valid or is stale in step S6. If the response was still valid, a Not Modified status code would be returned to the client in step S7. However, if the response was deemed to be invalid in step S6, a response would be built in step S3. After the response is built, a composite of attributes would be generated in step S8. That composite would then be analyzed in step S9 for cacheability. Based on the analysis, an entity tag would be generated in step S10, and the new response and entity tag would be sent to the client in step S11.

It should be understood that the present invention can be realized in hardware, software, or a combination of hardware and software. Any kind of computer system(s)—or other apparatus adapted for carrying out the methods described herein—is suited. A typical combination of hardware and software could be a general purpose computer system with a computer program that, when loaded and executed, carries out the respective methods described herein. Alternatively, a specific use computer, containing specialized hardware for carrying out one or more of the functional tasks of the invention, could be utilized. The present invention can also be embedded in a computer program product, which comprises all the respective features enabling the implementation of the methods described herein, and which—when loaded in a computer system—is able to carry out these methods. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the preferred embodiments of this invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims.

I claim:

1. A method for validating remotely cached dynamic content web pages, comprising:

analyzing a plurality of parts of a response to a client request to identify a plurality of attributes thereof, wherein the attributes identify a set of dependencies of the content on sources of dynamic content;

determining a cacheability of the response, the sources of dynamic content in the response and the set of dependencies on the sources;

generating an entity tag based on the cacheability, the sources and the set of dependencies, wherein the entity tag identifies the sources and includes cacheability flags and time values associated with the set of dependencies;

returning and caching the response and the entity tag on the client;

receiving a subsequent request from the client with the entity tag; and analyzing the entity tag by comparing time values within the entity tag associated with the set of dependencies to corresponding time values for the sources to determine if the cached response is valid, wherein the comparison is made without evaluating or rebuilding the response.

2. The method of claim 1, further comprising:

sending a status code to the client if the cached response is valid; and displaying the cached response.

3. The method of claim 1, further comprising generating a new response if the cached response is not valid;

determining a cacheability of the new response, sources of dynamic content in the new response and a set of dependencies on the sources of the dynamic content in the new response;

generating a new entity tag based on the cacheability of the new response, the sources of dynamic content in the new response and the set of dependencies on the sources of the dynamic content in the new response; and returning and caching the new response and the new entity tag on the client.

4. The method of claim 1, wherein the analyzing step comprises:

decoding the entity tag;

identifying the sources; and determining if the cached response is valid, wherein the cached response is valid if the time values within the entity tag match the corresponding time values for the sources.

5. The method of claim 1, wherein the set of dependencies comprises at least one of a database design, database data, and document data.

6. The method of claim 1, wherein the returning and caching step comprises:
   encoding the entity tag; and
   returning the entity tag to the client in a header accompanying the response.

7. The method of claim 1, wherein the determining step comprises creating the cacheability flags based on the set of dependencies, and wherein the entity tag includes the cacheability flags.

8. The method of claim 7, wherein the entity tag further includes a version number, a database design time value and a data time value.

9. The method of claim 8, wherein the entity tag further comprises at least one of a document identifier and a user name.

10. A method for validating remotely cached dynamic content web pages, comprising:
   analyzing a plurality of parts of a response to a client request to identify a plurality of attributes thereof, wherein the attributes identify a set of dependencies of the content on sources of dynamic content;
   determining a cacheability of the response, the sources of dynamic content in the response and the set of dependencies on the sources;
   generating an entity tag, wherein the entity tag identifies the sources and includes cacheability flags and time values associated with the set of dependencies;
   returning and caching the response and the entity tag on the client;
   receiving a subsequent request for the dynamic content web page from the client with the entity tag; and
   comparing the time values in the entity tag with corresponding time values for the sources to determine if the cached response is valid, wherein the comparison is made without evaluating or rebuilding the response.

11. The method of claim 10, further comprising:
   sending a status code to the client if the cached response is valid; and
   displaying the cached response.

12. The method of claim 10, further comprising
   generating a new response if the cached response is not valid;
   determining a cacheability of the new response, sources of dynamic content in the new response and a set of dependencies on the sources of the dynamic content in the new response;
   generating a new entity tag, wherein the new entity tag identifies the sources of the dynamic content in the new response, and includes cacheability flags and time values associated with the set of dependencies on the sources of the dynamic content in the new response; and
   returning and caching the new response and the new entity tag on the client.

13. The method of claim 10, wherein the analyzing step comprises:
   identifying the sources based on the entity tag received with the subsequent request; and
   comparing the time values within the entity tag to corresponding time values for the sources to determine if the cached response is valid, wherein the cached response is valid if the time values within the entity tag match the corresponding time values for the sources.

14. The method of claim 10, wherein the time values comprise a database design time value and a data time value.

15. The method of claim 10, wherein the set of dependencies comprises at least one of a database design, database data, and document data.

16. The method of claim 10, wherein the entity tag further comprises at least one of a version number, a document identifier and a user name.

17. The method of claim 10, wherein the returning and caching step comprises:
   encoding the entity tag; and
   returning the entity tag to the client in a header accompanying the response.

* * * * *